UNITED STATES PATENT OFFICE.

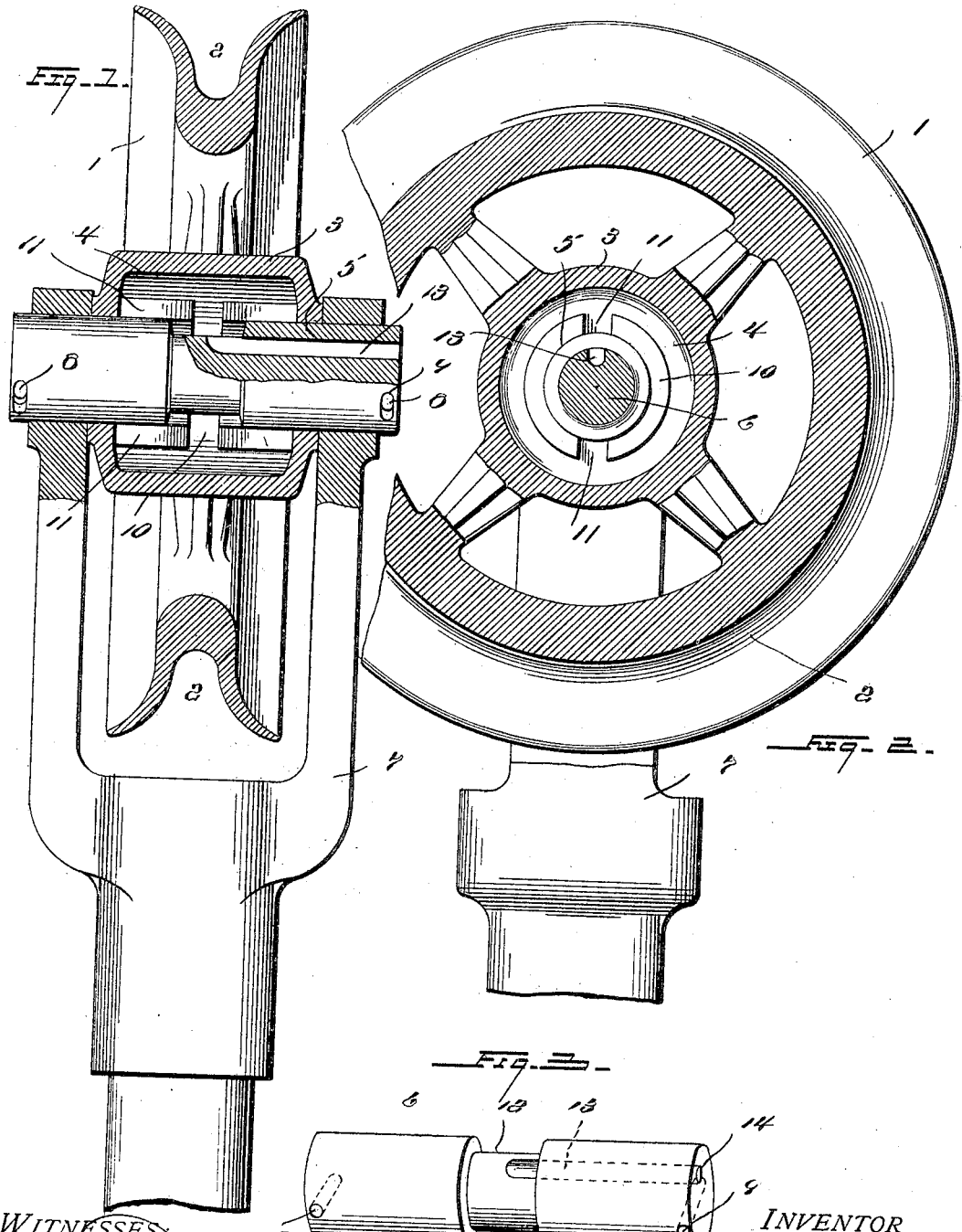

JOHN HENSLEY, OF HUNTINGTON, INDIANA.

TROLLEY-WHEEL.

No. 812,847.

Specification of Letters Patent.

Patented Feb. 20, 1906.

Application filed November 6, 1905. Serial No. 286,079.

*To all whom it may concern:*

Be it known that I, JOHN HENSLEY, a citizen of the United States, residing at Huntington, in the county of Huntington and State of Indiana, have invented a new and useful Improvement in Trolley-Wheels, of which the following is a specification.

My invention relates to improvements in trolley-wheels, and pertains more particularly to means for lubricating the same.

The object of my invention is to provide a lubricating trolley-wheel of this character in which the wheel is provided with an oil or grease containing cavity and from which the oil is fed to the bearing-surface of the hub, also means whereby the cavity is filled with oil or grease through the shaft upon which the wheel rotates without either removing the shaft or wheel.

Another object of my invention is to provide a wheel of this character which is simply cast without bushings and in which the oil is fed to all of the bearing-surface of the shaft.

In the accompanying drawings, Figure 1 is a vertical transverse sectional view of a harp, showing my shaft and trolley-wheel applied thereto. Fig. 2 is a vertical longitudinal sectional view of the wheel as applied in Fig. 1; and Fig. 3 is an enlarged perspective view of the shaft, showing the central groove and the filling-channel.

Referring now to the drawings, 1 indicates a wheel which is preferably cast and of any desired form or design, but having the usual trolley-groove 2 and its outer periphery. The said wheel is provided with an enlarged hub 3, which takes the place of the usual bushing used in trolley-wheels of this character. The said hub is provided with a broad circumferential cavity 4, which extends nearly the whole length of the hub. In wheels of this character it has been necessary to remove the spindle or uncap an orifice to fill the grease-cavity, and to avoid this is the object of my invention. The said hub, as shown, is provided with the opening 5, through which the shaft or spindle 6 passes, the outer ends of said shaft or spindle being mounted in the ends of the harp 7 and secured therein by cotter-pins 8, which pass through the openings 9 in the axle or shaft. The hub at the center is provided with an opening 10, which extends entirely around the hub and communicates with the grease-cavity 4, and extending from each side of said opening 10 and on opposite sides of the hub are slots 11, which extend adjacent to the ends of the hub and are also in communication with the grease-cavity and through which the lubricant is fed to the bearing-surface of the axle or shaft. The said shaft 6 is mounted in the harp against rotation and is provided intermediate its ends with a circumferential groove 12, which registers with the circumferential opening 10 and is of a width approximately the same. Communicating with the inner face of said groove 12 is an oil-channel 13, which extends out to the end 14 of the shaft or spindle and through which the oil is forced to the oil or grease cavity in the hub of the wheel.

From the foregoing description it will be seen that when the grease-cavity 4 has become empty to fill the same the trolley-wheel is not disturbed nor is any cap removed therefrom, but the grease is forced through the grease-channel 13, which is left open, to the circumferential groove 12 and from there passes into the grease-cavity through the opening 10, and thus the grease-cavity is filled. When the wheel is rotated by the engagement thereof with the trolley-wire, the grease is slowly withdrawn from the groove in the spindle by centrifugal force toward the outer portion of the cavity, and in its outward course it is caught by the slots 11 and evenly fed to the bearing-surface of the shaft or spindle; but when the wheel stops rotating a sufficient amount of grease passes through the slots 11 to the shaft or spindle to lubricate the same sufficiently to run it until it stops rotating, when the lubricant again passes to the shaft.

Having thus fully described my invention, what I claim as new, and desire to secure by Letters Patent, is—

1. A trolley-wheel, comprising a hub having a lubricant-cavity therein and a circular opening in communication with the cavity in the hub, a shaft passing through the ends of the hub and having a circumferential groove therein in communication with the circular opening in the hub, and said shaft having a lubricant-channel passing longitudinally through the shaft from one end and having its inner end in communication with said circumferential groove in the shaft.

2. A trolley-wheel, comprising a hub having a lubricant-cavity extending around within the same, said hub having a circular opening in communication with the cavity, and said hub also having an opening extending longitudinally of the hub and in communication with the cavity and through which the lubricant is fed to the shaft, a shaft passing through the hub and having a circumferential groove therein in communication with the circular opening in the hub, and said shaft having a lubricant-channel passing longitudinally through the shaft from one end and having its inner end in communication with said circumferential groove in the shaft.

In testimony whereof I have signed my name to this specification in the presence of two subscribing witnesses.

JOHN HENSLEY.

Witnesses:
EBEN LESH,
JACOB BOOS.